United States Patent
Babaei et al.

(10) Patent No.: US 10,103,793 B2
(45) Date of Patent: Oct. 16, 2018

(54) SYSTEM AND METHOD FOR SPATIAL MULTIPLEXING IN LOS ENVIRONMENTS

(71) Applicant: Cable Television Laboratories, Inc., Louisville, CO (US)

(72) Inventors: Alireza Babaei, San Jose, CA (US); Jennifer Andreoli-Fang, Boulder, CO (US)

(73) Assignee: Cable Television Laboratories, Inc, Louisville, CO (US)

( * ) Notice: Subject to any disclaimer, the term of this patent is extended or adjusted under 35 U.S.C. 154(b) by 0 days.

(21) Appl. No.: 15/856,557

(22) Filed: Dec. 28, 2017

(65) Prior Publication Data

US 2018/0123649 A1 May 3, 2018

Related U.S. Application Data

(62) Division of application No. 14/937,292, filed on Nov. 10, 2015, now Pat. No. 9,866,289.

(51) Int. Cl.
*H04B 7/04* (2017.01)
*H04B 7/08* (2006.01)
*H04B 7/0426* (2017.01)

(52) U.S. Cl.
CPC ........... *H04B 7/043* (2013.01); *H04B 7/0848* (2013.01)

(58) Field of Classification Search
CPC ............................. H04B 7/043; H04B 7/0848
See application file for complete search history.

(56) References Cited

U.S. PATENT DOCUMENTS

| | | | | |
|---|---|---|---|---|
| 7,787,554 B1* | 8/2010 | Nabar | ................... | H04B 7/043 375/267 |
| 8,116,267 B2* | 2/2012 | van Rensburg | ...... | H04B 7/0452 370/329 |
| 8,494,084 B1* | 7/2013 | Nabar | ................... | H04B 7/043 375/260 |
| 8,604,989 B1* | 12/2013 | Olsen | ................... | H01Q 25/008 343/700 MS |
| 8,824,596 B1* | 9/2014 | Wang | ................... | H04B 7/0404 375/267 |
| 2003/0130003 A1* | 7/2003 | Won | ....................... | H04W 52/42 455/522 |
| 2005/0237971 A1* | 10/2005 | Skraparlis | ............ | H04B 7/0417 370/329 |
| 2009/0313370 A1* | 12/2009 | Rhoads | ...................... | G01S 5/18 709/224 |
| 2010/0067596 A1* | 3/2010 | Park | ................... | H04L 25/03171 375/262 |
| 2010/0123625 A1* | 5/2010 | Martin | ................... | H01Q 1/246 342/377 |
| 2010/0322336 A1* | 12/2010 | Nabar | ................... | H04B 7/043 375/267 |
| 2012/0230380 A1* | 9/2012 | Keusgen | .............. | H04B 7/0695 375/227 |
| 2013/0301454 A1* | 11/2013 | Seol | ........................ | H04B 7/043 370/252 |
| 2015/0325913 A1* | 11/2015 | Vagman | ............... | H01Q 3/2605 342/368 |
| 2016/0226640 A1* | 8/2016 | Seol | ........................ | H04B 7/26 |

* cited by examiner

*Primary Examiner* — Lewis West

(74) *Attorney, Agent, or Firm* — Armstrong Teasdale LLP

(57) ABSTRACT

The present system and method provides a spatial multiplexing scenario that is performed purely in the analog domain when transmit and receive arrays are in Line of Sight (LoS) and hence significantly reduce the DSP requirements of massive MIMO systems.

19 Claims, 4 Drawing Sheets

SYSTEM AND METHOD FOR SPATIAL MULTIPLEXING IN LOS ENVIRONMENTS

CROSS-REFERENCE TO RELATED APPLICATIONS

This application is a divisional of U.S. application Ser. No. 14/937,292, filed Nov. 10, 2015, the disclosures and benefits of which are hereby incorporated in their entireties by reference herein.

BACKGROUND

In wireless communications, MIMO processing is typically done at baseband and in the digital domain. FIG. 1 illustratively represents such a prior art system 10. Transmit symbols 10 are passed through a baseband digital MIMO processor 20 before transmission. MIMO processor 20 is configured with a pre-processor/pre-coder. Processor 20 utilizes, for example, a pre-coding matrix, which determines the number of spatial streams, the spatial multiplexing, and beamforming gains. System 10 also includes an antenna array for transmitting the digitally processed data. In large-scale antenna systems (e.g., massive MIMO in 5G wireless systems), the digital processing can be significantly high, which adds cost, complexity, increased point of failure, energy consumption, etc.

SUMMARY OF THE INVENTION

The present spatial multiplexing system and method is performed purely in the analog domain between transmit and receive arrays that are within line of sight (LoS) of one other. Such a system and method significantly reduces the digital signal processing (DSP) requirements for massive MIMO systems. Examples of systems that may benefit from the these novel areas include 5G and massive MIMO systems, A present disclosure describes a system and method for analog, line of sight (LoS) spatial multiplexing communication, which recovers one or more of analog transmit signals from two or more of analog receive signals. The present system and method accomplishes this by processing two or more analog receive signals within a receive processor by applying at least a portion of an inverse steering matrix to a plurality of analog receive signals (also discussed as a receive vector) received at a receive array. By applying the inverse steering matrix to a plurality of analog receive signals the system and method can extract one or more analog transmit signals from the inverse steering matrix processed two or more analog receive signals.

In an embodiment, the present system and method is configured to convert two or more transmit modulation symbols into the two or more analog transmits signals and transmit the analog transmit signals from two or more different transmit antenna elements of a transmit array and receive two or more analog receive signals at two or more receive antenna elements of a receive array. The two or more analog receive signals are different combinations of the transmitted signals.

In an embodiment, the present system and method utilizes a first and second transmit element and a first receive element. A separation distance, D, between the first and second transmit element is such that signals sent from the first and second transmit element that are received at the first receive element are out of phase by a predetermined amount to facilitate analog processing at the receive side to cover the transmitted signals.

In an embodiment, the present system and method utilizes a relationship between transmit and receive signals as described by an inverse steering matrix to recover a transmit vector from a receive vector.

DETAILED DESCRIPTION OF THE FIGURES

Massive MIMO is one of the key technologies for 5G communication systems and is particularly amenable in millimeter wave (mmWave) communication systems. Recent work in massive MIMO has focused on hybrid beamforming techniques. Hybrid Beamforming is a combination of analog and digital Beamforming and results in a tradeoff between hardware complexity and system performance.

In mmWave communication systems, the channel tends to be Ricean due to the use of large antenna arrays, which can filter most multipath signals. Furthermore, in a small cell, which is one of the key technologies utilized in 5G systems, LoS propagation is more likely to occur. The present disclosure details a spatial multiplexing technique performed purely in the analog domain and between LoS transmit and receive arrays.

Problem Formulation

One embodiment of the present system is implemented as a uniform linear array (ULA) of transmit and receive antenna elements, each with n antenna elements. One aspect of the present system and method determines a minimum distance between antenna elements (e.g., transmit antenna elements), $D_{ULA}$. Minimum distance $D_{ULA}$ enables a preferred separation of, for example, transmitted signals received at an associated receiving system and is calculated as, $$D_{ULA} = \sqrt{\frac{R\lambda}{n}}, \tag{1}$$

where 'R' represents the distance between transmit and receive arrays,
$\lambda$ is the transmit wavelength, and
n is the number of antenna elements in the transmit array.

It will be understood that in a uniform planar array (UPA) having n×n transmit and receive arrays, the minimum distance will be the similar to the ULA case, i.e., $$D_{UPA} = \sqrt{\frac{R\lambda}{n}}.$$

In addition, a uniform planar array (UPA) may have n×m transmit and receive arrays, or n×m transmit arrays and j×k receive arrays without departing form the scope herein. For these reason, and for purposes of clarity, all examples and embodiments are discussed in a ULA system or are described generically. It will be understood that the systems and methods described below also apply to uniform planar arrays and may require only trivial modification, if any at all for use with uniform planar arrays. In addition, for sake of clarity $D_{UPA}$ and $D_{ULA}$ are sometimes replaced by the generic distance variable 'D', which denotes the minimum separation distance between the antenna elements in an array to enable a preferred separation of transmitted signals at an associated receiving system.

Figure 1:
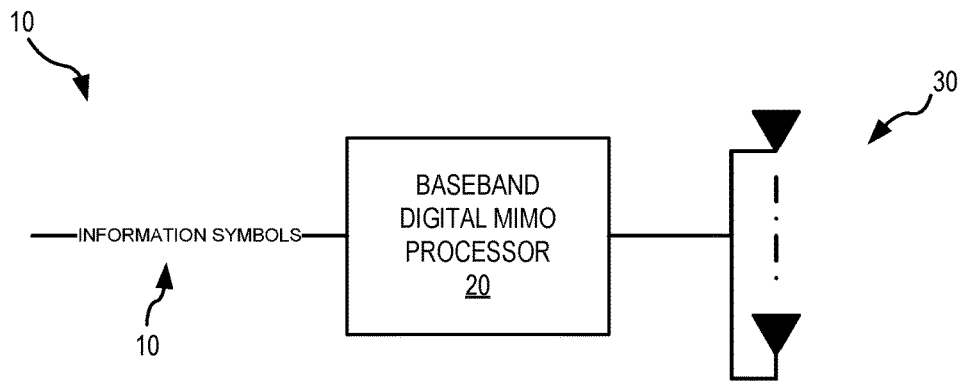
FIG. 1 schematically illustrates a prior art digital MIMO processing system.
Figure 2:
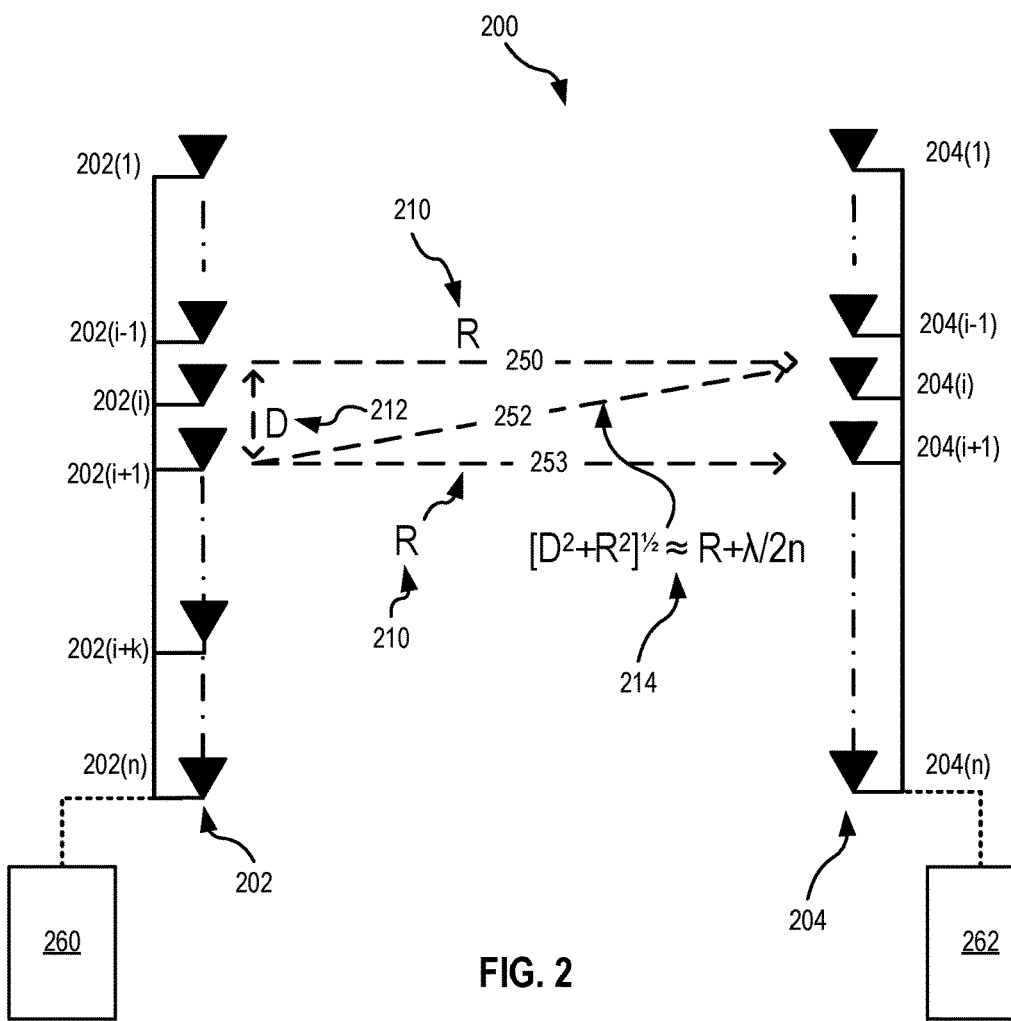
FIG. 2 schematically representation a spatial multiplexing system with LoS propagations, in an embodiment.

FIG. 2 shows an analog, spatial multiplexing system 200 with LoS propagations. System 200 is shown with transmit analog processor 260, transmit array 202, receive analog processor 262, and receive array 204. Transmit array 202 is formed with n transmit elements 202(1)-202(n). Receive array 204 is formed with n receive elements 204(1)-204(n). System 200 is shown with two signals 250 and 252. Signal 250 originates at transmit element 202(i) and terminates at receive element 204(i). Signal 252 originates at transmit element 202(i+1) and terminates at the same the same receive element 204(i). Signal 250 has a path length R 210 and signal 214 has a path length $\sqrt{D^2+R^2}$ 214. Path length R 210 is equivalent to the separation distance between transmit array 202 and receive array 204. Signal 252's path length $\sqrt{D^2+R^2}$ 214 may be calculated as, $$\sqrt{D^2 + R^2} = \sqrt{\frac{R\lambda}{n} + R^2} = R\sqrt{1 + \frac{\lambda}{nR}} \approx R\left(1 + \frac{\lambda}{2nR}\right) = R + \frac{\lambda}{2n}. \quad (2)$$

It should be understood that transmit and receive arrays need not have the same number of transmit and receive elements. That is, a transmit array may be configured with n transmit elements and a receive array may be configured with m receive elements, where n≠m. If n≠m the equations discussed below will require modification, although such changes are well within the capabilities of the skilled artisan.

The difference between path lengths R and $$R + \frac{\lambda}{2n}$$

can cause a phase difference between signals 250 and 252. For example, in system 200 with 2π radians within a single wave length λ, there may be as much as $$\varphi = \frac{2\pi}{2n} = \frac{\pi}{n}$$

phase difference between signals 250 and 252. Furthermore, there may be as much as $$\varphi = \frac{k\pi}{n}$$

phase difference between signal 250 and a signal transmitted from transmit antenna elements 202(i+k) (not shown to maintain clarity of illustration) and received by the same receive element 204(i). Thus the phase difference between signals 250 and 252 is $$\varphi = \frac{k\pi}{n}$$

which is merely the case where k=1. It will be understood by the skilled artisan that a similar issue exists in UPA system (not shown).

It should also be understood that the difference between path lengths can cause a phase difference between signals transmitted by the same transmit element and received by different receive elements, for example signals 252 and 253 transmitted by element 202(i+1) and received by elements 204(i) and 204 (i+1). Similar to that discussed above, in system 200 there may be as much as $$\varphi = \frac{\pi}{n}$$

phase difference between signals 252 and 253.

Figure 3A:
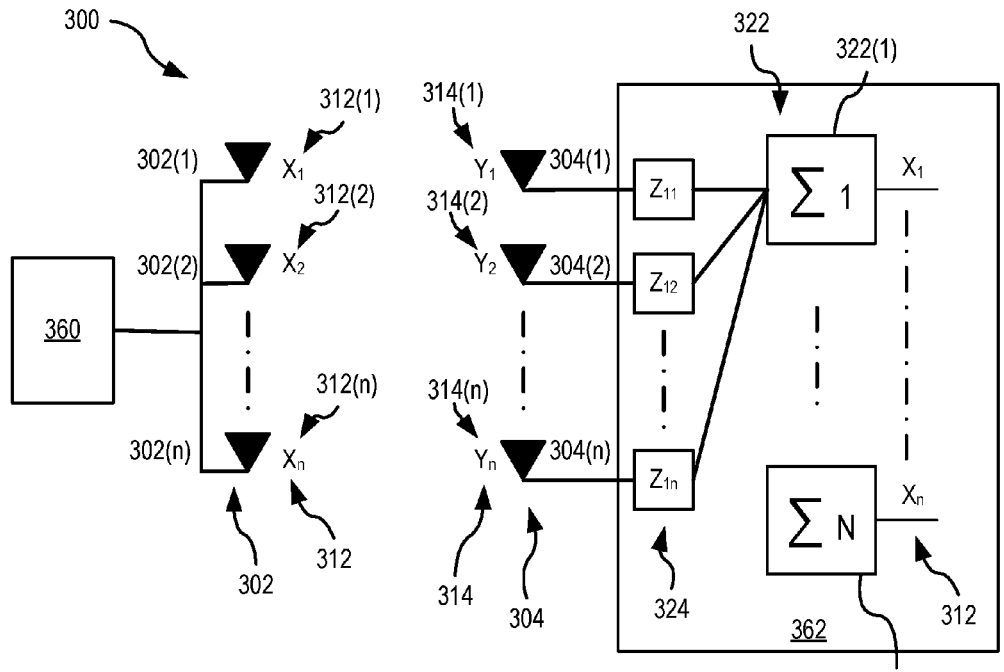
FIG. 3A schematically representation of an analog spatial multiplexing processing system with LoS propagation, in an embodiment.

FIG. 3A depicts one embodiment of an analog spatial multiplexing system with LoS propagation, system 300, represented in block diagram. System 300 is similar to LoS system 200, FIG. 2 but additionally shows a receive analog processor 362, which is similar to receive analog processor 262 of FIG. 2, including inverse steering matrix components $Z_{11}$-$Z_{1n}$ 324 and summation block $\Sigma_1$-$\Sigma_n$ for recovering signal $X_1$-$X_n$. System 300 is shown with a transmit analog processor 360 transmitting a vector X 312 of $X_1$-$X_n$ transmit symbols 312(1)-312(n) from a transmit array 302 and a receive analog processor 362 connected to a receive array 304 for receiving a vector Y 314 of $Y_1$-$Y_n$ receive data 314(1)-314(n). Shown connected to each receive element 304(1)-304(n) is one of the inverse steering matrix components $Z_{11}$-$Z_{1n}$ 324, respectively. The $Z_{11}$-$Z_{1n}$ function blocks form an inverse steering matrix array, which represent the $Z_{11}$-$Z_{1n}$ entries in inverse steering matrix Z, discussed in more detail below. Transmit array 302 and received array 304 are similar to transmit array 202 and receive antenna 204, respectively. Transmit analog processor 360 and receive analog processor 362 are similar to transmit analog processor 260 and receive analog processor 262, respectively. Inverse steering matrix function blocks $Z_{11}$-$Z_{1n}$ apply the $i^{th}$ inverse steering matrix Z element to the respective $i^{th}$ receive signal in the vector of received signals Y. For sake of clarity of illustration only inverse steering matrix components $Z_{11}$-$Z_{1n}$ 324 connected to summation block $\Sigma_1$ 322(1) for recovering transmit signal $X_1$ are shown. Additional sets of inverse steering matrix components 324 may be provided for recovering one or more other transmit signals 312 $X_2$-$X_n$. Alternatively, the existing inverse steering matrix components 324 represent a single component or a set of components that may be adapted, configured, programmed, etc. to apply an appropriate inverse steering function extracted from an appropriate entry $Z_{11}$-$Z_{nn}$ in the inverse steering matrix (see equation (5), below) to the received signals $Y_1$-$Y_n$ 314 for purposes of recovering one or more of transmit signals $X_1$-$X_n$ 312.

Figure 3B:
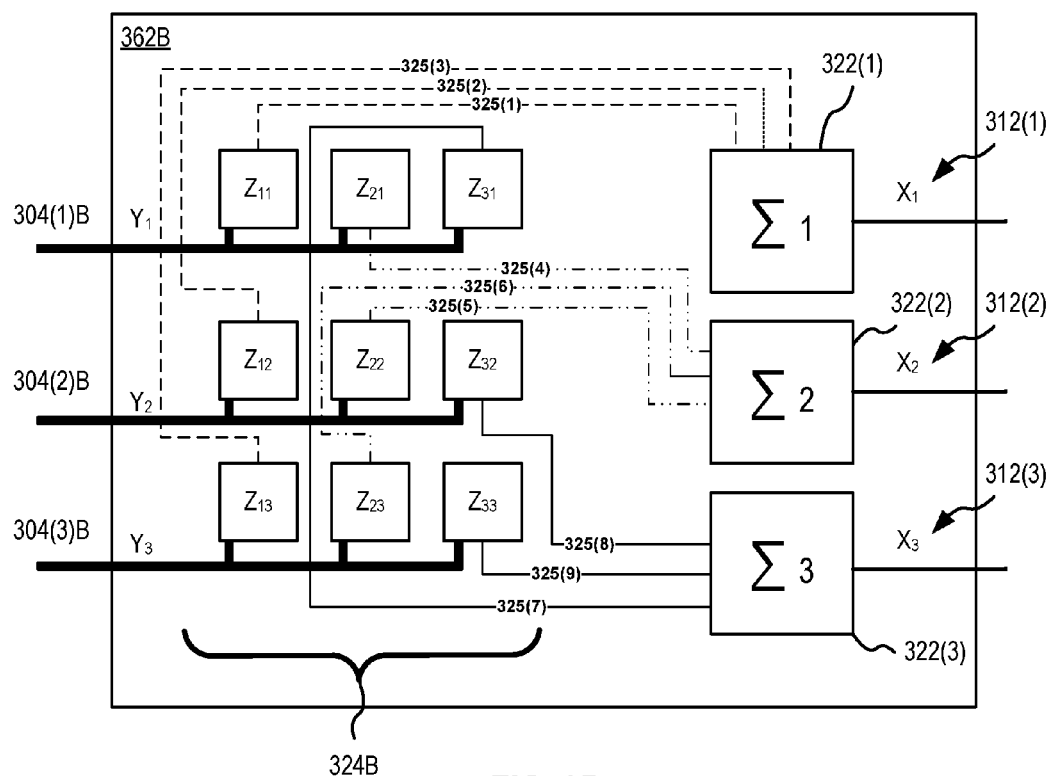
FIG. 3B schematically representation of an n=3 receive analog processor, in an embodiment.

One exemplary receive analog processor 362B is symbolically represented in FIG. 3B. Receive control 362B is configured with inverse steering matrix components 324B, and summation blocks 322(1)-(3) which output recovered transmit signals $X_1$-$X_3$ 312(1)-(3). Inverse steering matrix components 324B is in communication with receive array 304 and summation blocks 322.

Receive signal $Y_1$ is sent to the $Z_{11}$, $Z_{21}$, and $Z_{31}$ inverse steering matrix components 324B. Receive signal $Y_2$ is sent to the $Z_{12}$, $Z_{22}$, and $Z_{32}$ inverse steering matrix components 324B. Receive signal $Y_3$ is sent to the $Z_{13}$, $Z_{23}$, and $Z_{33}$ inverse steering matrix components 324B. Inverse steering matrix components $Z_{11}$, $Z_{12}$, and $Z_{13}$ send processed receive signals 325(1), 325(2), and 325(3) to summation block 322(1) for processing, which produces transmit signal $X_1$ 312(1). Inverse steering matrix components $Z_{21}$, $Z_{22}$, and $Z_{23}$ send processed receive signals 325(4), 325(5), and 325(6) to summation block 322(2) for processing, which produces transmit signal $X_2$ 312(2). Inverse steering matrix components $Z_{31}$, $Z_{32}$, and $Z_{33}$ send processed receive signals 325(7), 325(8), and 325(9) to summation block 322(3) for processing, which produces transmit signal $X_3$ 312(3).

Returning to FIG. 3A, a transmit vector X of transmitted signals 312 is represented by $X=[X_1, X_2, \ldots, X_n]^T$ and a receive vector Y of received signals 314 is represented by $Y=[Y_1, Y_2, \ldots, Y_n]^T$. A variable $\alpha$ is defined as $$\alpha = e^{i\frac{k\pi}{n}}.$$

Where transmitting elements are adjacent one another k=1, and this equation reduces to $$\alpha = e^{i\frac{\pi}{n}}.$$

If different modulation symbols are transmitted as signals from each transmit antenna element 302(1)-302(n), then $$Y = \Delta X, \quad (3)$$

where $$\Delta = \begin{bmatrix} 1 & \alpha & \ldots & \alpha^{n-1} \\ \alpha & 1 & \ldots & \alpha^{n-2} \\ \vdots & \vdots & \vdots & \vdots \\ \alpha^{n-1} & \alpha^{n-2} & \ldots & 1 \end{bmatrix}.$$

$\Delta$ represents the steering matrix between transmit array 302 and receive array 304. Receive analog processor 362 is configured to decode, in the analog domain, the receive vector Y 314 to recover the transmit vector X 312, and thus the transmitted symbols $X_1$-$X_n$. Equation (4), below, represents one exemplary algorithm for recovering the transmit vector X 312 from the receive vector Y 314 utilizing the inverse of the steering matrix, as follows:

$$X = \Delta^{-1} Y. \quad (4)$$

Thus, when there is line of sight within system 300, transmitted symbols $X_1$-$X_n$ can be recovered at receive analog processor 362 by applying the inverse steering matrix (i.e., $\Delta^{-1}$) to the receive vector Y. Due to processing in the analog domain, this method reduces or eliminates digitally pre-coding or preprocessing at transmit analog processor 360 and digital processing at receive analog processor 362. That is, the received signals $Y_1$-$Y_n$ at receive antenna array 304 are processed in the analog domain by applying the inverse steering matrix $\Delta^{-1}$ to recover the originally transmitted signals 312, all prior to any digital processing. For sake of simplicity and clarity, the inverse matrix $\Delta^{-1}$ is renamed here as Z, such that, $$Z = \Delta^{-1} = \begin{bmatrix} Z_{11} & Z_{12} & \ldots & Z_{1n} \\ Z_{21} & Z_{22} & \ldots & Z_{2n} \\ \vdots & \vdots & \vdots & \vdots \\ Z_{n1} & Z_{n2} & \ldots & Z_{nn} \end{bmatrix}. \quad (5)$$

The signal $X_i$, which is the ith entry in the transmit vector X, can be recovered as follows, $$X_i = \Sigma_{j=1}^{n} z_{ij} Y_j. \quad (6)$$

It should be understood that the portion of inverse steering matrix Z equation (6) for calculating a transmitted symbol from the set of received signals 314 is represented as the set of $Z_{11}$-$Z_{1n}$ inverse steering matrix blocks 324, which correspond to the first row of the inverse steering matrix in equation (5). In addition, the summation $\Sigma_{j=1}^{n}$, of equation (6) is represented in FIG. 3A as a set of n summation blocks $\Sigma_1$-$\Sigma_n$ 322(1)-(n). FIG. 3A as shown represents calculating the $X_1$ transmitted signal. It should be understood that any single transmitted symbol from the set of transmitted symbols $X_1$-$X_n$ 312 or a plurality of transmitted symbols from the set of transmitted symbols $X_1$-$X_n$ 312 may be calculated.

Figure 4:
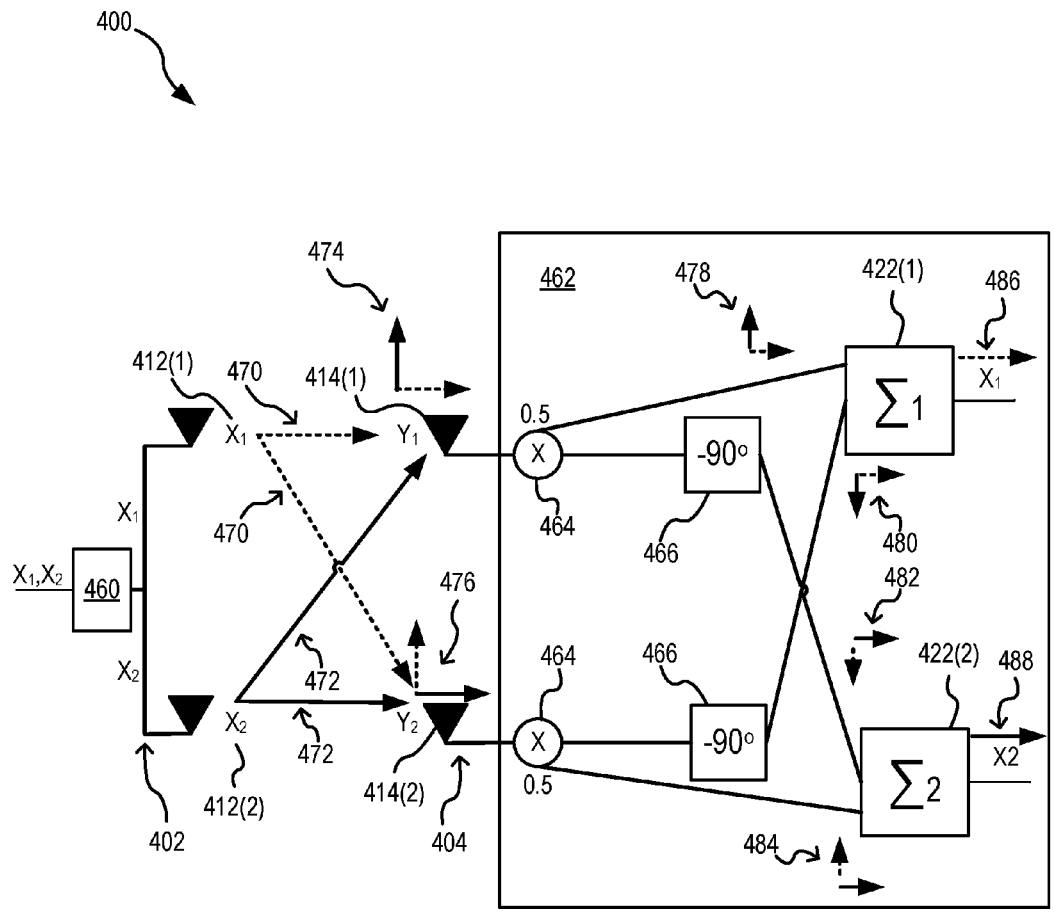
FIG. 4 shows the analog processing spatial multiplexing system with LoS propagation of FIG. 3A with n=2, in an embodiment.

FIG. 4 illustrates one example of an analog LoS MIMO system, system 400, with a transmit array 402 having two transmit antennas 412(1)-(2) and a receive array 404 having two receive antennas 414(1)-(2), such that system 400 is an n=2 system. Transmit array 402 is connected to transmit analog processor 460. Receive array 404 is connected to receive analog processor 462. Receive analog processor 462 is configured with attenuating splitters 464, phase rotators 466, and summation blocks 422(1) and (2). Attenuating splitters 464 and phase rotators 466 represented one implementation of an n=2 inverse steering matrix of equation (5), in an embodiment. It is possible to implement this differently in an n=2 system and may be implemented similarly or differently in other, more complex systems, as long as the appropriate inverse steering matrix element $Z_{nn}$ is applied to its corresponding receive signal.

In operation, transmit analog processor 460 takes as input symbols $X_1$, $X_2$ and outputs $X_1$ to transmit antennas 412(1) and $X_2$ to transmit antenna 412(2) for transmission to receive array 404. Transmit antennas 412(1) and 412(2) transmit symbols $X_1$ and $X_2$ as signals 470 and 472, respectively. Receive antenna 414(1) receives signal $Y_1$ 474 and receive antenna 414(2) receives signal $Y_2$ 476. Signal $Y_1$ 474 is composed of signals 470 and 472. As detailed in FIG. 2 and its associated description, a separation distance between transmit antennas, in this case transmit antennas 412(1) and 412(2), may cause a phase difference between two (or more) signals received at a receive antenna in the receive array. This antenna separation distance based phase difference may be utilized to facilitate the extraction of the original signals, in this case $X_1$ and $X_2$.

As stated above, system 400 is configured with two transmit 412(1)-(2) and two receive antennas 414(1)-(2), which forms an n=2 system. Based on an n=2 system equation (5) becomes equation (7), below, and the variable α becomes $$\alpha = e^{\frac{i\pi}{2}}.$$

With n=2, by applying Euler's formula, and solving the inverse matrix (right hand side of equation (7)), equation (5) becomes the 2 by 2 matrix represented on the left hand side of equation (7), $$Z = \begin{bmatrix} 1 & \alpha \\ \alpha & 1 \end{bmatrix}^{-1} = \begin{bmatrix} 1 & i \\ i & 1 \end{bmatrix}^{-1} = \begin{bmatrix} 0.5 & -0.5i \\ -0.5i & 0.5 \end{bmatrix}. \quad (7)$$

With i=1 and i=2, equations (6) can be used to extract $X_1$ and $X_2$, $$X_1 = 0.5Y_1 - 0.5iY_2 \quad (8)$$

$$X_2 = -0.5iY_1 + 0.5Y_2 \quad (9)$$

By way of a second example, with n=3 we get the 3 by 3 matrix, $$Z = \quad (10)$$

$$\begin{bmatrix} 1 & \alpha & \alpha^2 \\ \alpha & 1 & \alpha \\ \alpha^2 & \alpha & 1 \end{bmatrix}^{-1} = \begin{bmatrix} \frac{1-\alpha^2}{\alpha^4 - 2\alpha^2 + 1} & \frac{\alpha^3 - \alpha}{\alpha^4 - 2\alpha^2 + 1} & 0 \\ \frac{\alpha^3 - \alpha}{\alpha^4 - 2\alpha^2 + 1} & \frac{1-\alpha^4}{\alpha^4 - 2\alpha^2 + 1} & \frac{\alpha^3 - \alpha}{\alpha^4 - 2\alpha^2 + 1} \\ 0 & \frac{\alpha^3 - \alpha}{\alpha^4 - 2\alpha^2 + 1} & \frac{1-\alpha^2}{\alpha^4 - 2\alpha^2 + 1} \end{bmatrix}.$$

With $$\alpha = e^{\frac{i\pi}{3}}$$

and applying Euler's formula, equation (10) becomes, $$Z = \begin{bmatrix} 0.5 + 0.2887i & -5774i & 0 \\ -0.5774i & 0.5 + 0.2887i & -5774i \\ 0 & -0.5774i & 0.5 + 0.2887i \end{bmatrix}. \quad (11)$$

Using equation (6) with i=1, 2, and 3 we get $X_1$, $X_2$, $X_3$:

$$X_1 = (0.5 + 0.2887i)Y_1 + (-5774i)Y_2 \quad (12)$$

$$X_2 = (-0.5774i)Y_1 + (0.5 + 0.2887i)Y_2 + (-0.5774i)Y_3 \quad (13)$$

$$X_3 = (-0.5774i)Y_2 + (0.5 + 0.2887i)Y_3 \quad (14)$$

Thus, is can be seen that, in the analog domain, the transmitted symbols $X_1$-$X_n$ 312 can be recovered from the received symbols $Y_1$-$Y_n$ 314. This greatly reduces processing complexity, time, and power consumption.

Figure 5:
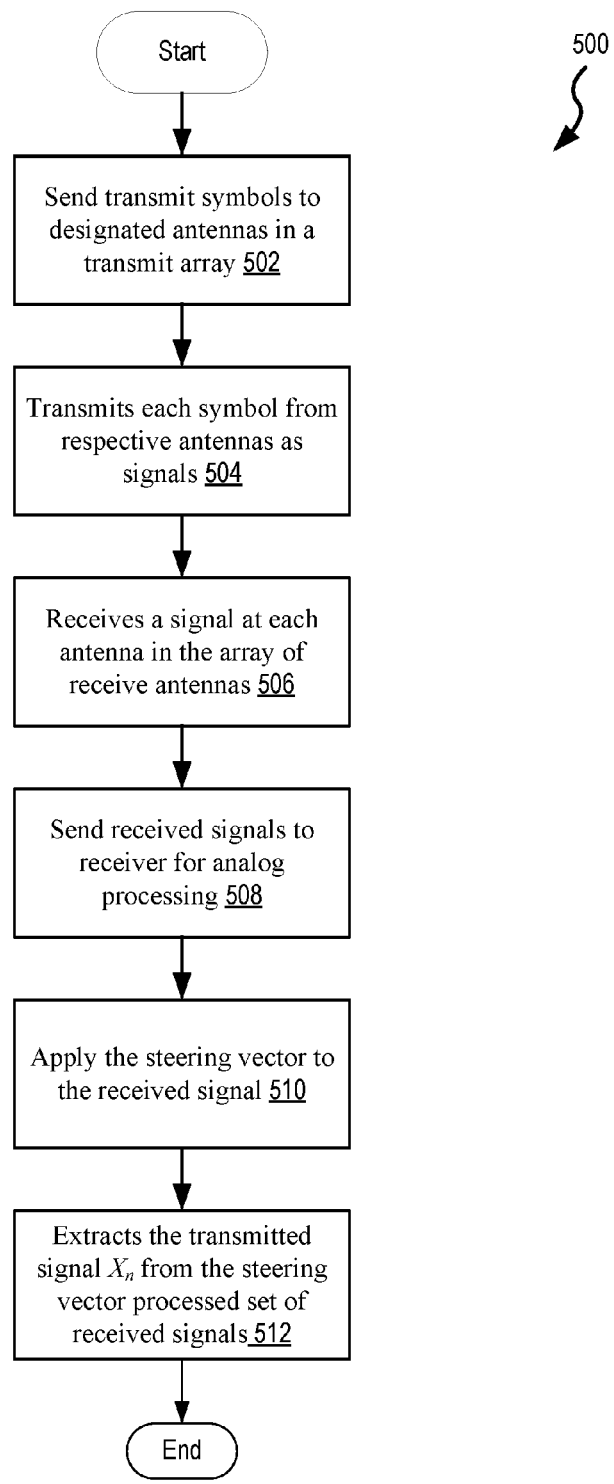
FIG. 5 is a flow chart for implementing analog, spatial multiplexing communication, in an embodiment.

FIG. 5 shows one exemplary method 500 for analog LoS MIMO communication. Method 500 is described as being implemented by system 400 of FIG. 4, an n=2 system, although any analog, LoS MIMO system may be use method 500 with only minor modifications that are well within the ability of the skilled artisan.

In step 502 method 500 sends transmit symbols to designated antennas in a transmit array. One example of step 502 is transmit analog processor 460 of FIG. 4 sending symbol $X_1$ to antenna 412(1) and symbol $X_2$ to antenna 412(2).

In step 504 method 500 transmits each symbol for respective antennas as signals. One example of step 504 is antennas 412(1) and 412(2) transmitting symbols $X_1$ and $X_2$, respectively.

In step 506 method 500 receives a signal at each antenna in the array of receive antennas. One example of step 506 is receive array 404 receiving signal $Y_1$ 474 at receive antenna 414(1) and signal $Y_2$ 476 at antenna 414(2).

In step 508 method 500 sends received signals to a connected receive analog processor for analog processing. One example of step 508 is antennas 414(1)-(2) (or array 404) sending signals 474-476 to receive analog processor 462. Receive analog processor 462 may be implemented as any analog processing unit of collection of analog processing units, either stand alone or incorporated into one or more receive side component.

In step 510 method 500 applies the inverse steering matrix to the received signal. One example of step 510 is receive analog processor 462 applying attenuating splitters 464 and phase shifters 466 to received signals $Y_1$ 474 and received signal $Y_2$ 476.

In step 512 method 500 extracts the transmitted signal from the inverse steering matrix processed set of received signals. One example of step 512 is summation block 422(1) summing signals 478 and 480 and summation block 422(2) summing signals 482 and 484. In another example of step 512, summation block 322(1), FIG. 3A, sums signals received from the set of inverse steering matrix blocks $Z_{11}$-$Z_{1n}$ 324 resulting in the recovery of transmitted single $X_1$. The same process occurs for each inverse steering matrix blocks $Z_{21}$-$Z_{2n}$-$Z_{n1}$-$Z_{nn}$ and associated summation block 322(2)-322(n) for the recovery of transmitted signals $X_2$-$X_n$.

It will be understood after reading the present disclosure that one or more of, R, λ, and n may be manipulated to optimize the present analog, spatial multiplexing system with LoS propagations to substantially optimize of analog processing. Such an optimization may occur during a setup phase of the present system or may occur periodically. Alternatively, optimization of the present system may be event driven, for example, during or after a weather or environmental event, during or after disruptive construction or infrastructure work, interference from one or more other RF source, etc. System optimization may also occur continuously or substantially continuously, for example, to compensate for persistent fluctuation that affect system utilized phase delays. Any one of these optimization process may utilize known techniques, one non-limiting example of which is a receiver-to-transmitter feedback loop for mechanically, arithmetically, or otherwise adjusting one or more of R, λ, n, the steering matrix, the inverse steering matrix, etc.

One manner in which optimization may occur is by adjusting the array-to-array distance R such that a transmitted signal arrives at a receive element out of phase by a desired amount. Although not necessary, such manipulations need only be within the range of less than a wave length. Alternatively, another optimization technique is adjusting the wavelength of the transmit signal, again with the aim of optimizing when the transmitted signal arrives at a receive element such that the phase delay is optimized to facilitate analog processing. Optimization may also be performed by adjusting the minimum distance between array elements. Adjusting the minimum distance between array elements may be accomplished in multiple ways, one non-limiting example of which is pruning elements, such as eliminating every other transmit element from a cycle of transmissions. This process will also reduce the number of elements active in a communication step. Pruning may also be used to reconfigure the elements of an array, for example, in the situation where a broken or otherwise inoperable array element exists. The inter-element distance may also be adjusted in other was, including but not limited to mechanically adjusting the distance between array elements.

The present system and method is disclosed herein as being configured with transmit and receive arrays having a parallel and opposing orientation such that the shortest distance between a transmit element and a receive element is the array to array separation distance R. In reality, this idealized situation may not even be achievable. Adjustments to the system may be made to compensate for non-ideal orientation. In one embodiment, orientation adjustments are performed mechanically. In another or the same embodiment, orientation adjustments are performed arithmetically. Arithmetically manipulations may be applied on an element by element basis such as by "virtually" adjusting one or more of R, λ, and n by adding or subtracting a constant or applying a situation based function to one or more of the parameters. Alternatively, orientation compensating arithmetic manipulations may be applied to the steering matrix, the inverse steering matrix, included as a static or dynamically adjusted variable, etc. Such manipulations are well within capability of the skilled artisan after reading the present disclosure.

It will also be understood that the separation distance D between transmit elements in the transmit array need not be the same as the separation distance between the receive element in the receive array. The present disclosure and associated figures show symmetry between transmit and receive arrays, but this is merely to simplify the drawings and associated description and is not meant to be limiting in any way. If changes are made to the separations distance in one or both of the transmit array and the receive array, the above equations may be modified accordingly, but such modifications are well within the capabilities of one skilled in the art after reading the present disclosure.

It will also be understood that the separation distance D between elements is the minimum separation distance. Other separation distance that satisfy the phase delay requirements for facilitating analog processing as detailed above may be used without departing from the scope herein.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An analog, line of sight (LoS) spatial multiplexing system, comprising:
    a transmit analog processor;
    a transmit array configured with a first transmit element and a second transmit element spaced apart by no less than a distance D, the first transmit element in communication with the transmit analog processor for receiving a first modulation symbol for transmitting as a first transmit signal, the second transmit elements in communication with the transmit analog processor for receiving a second modulation symbol for transmitting as a second transmit signal;
    a receive array configured with a first and a second receive element, the first receive element configured to receive a first receive signal comprising a combination of at least the first and the second transmit signals, the second receive element configured to receive a second receive signal comprising a different combination of at least the first and second transmit signals; and
    a receive analog processor in communication with the receive array for processing the first and second receive signals in the analog domain to recover at least one of the first transmit signal and the second transmit signal, wherein R is a distance between the first transmit element and the first receive element, n is the number of antenna elements in one or both of the transmit and receive arrays, and λ is a transmit wavelength of the first and second transmit signals such that the distance between the second transmit element and the first receive element is $$\sqrt{D^2 + R^2} = \sqrt{\frac{R\lambda}{n} + R^2} = R\sqrt{1 + \frac{\lambda}{nR}} \approx R\left(1 + \frac{\lambda}{2nR}\right) = R + \frac{\lambda}{2n}.$$

2. The system of claim 1, wherein the first modulation symbol is different from the second modulation symbol.

3. The system of claim 1, wherein R is a distance between the first transmit element and the first receive element, λ is a transmit wavelength of at least the first transmit signal and one or more of D, R, and λ relates to a phase delay between the first and second transmit signals and are adjustable to optimize the phase delay.

4. The system of claim 1, further comprising a $k^{th}$ transmit element, wherein the distance between a $k^{th}$ transmit element and the first receive element is $$R + \frac{k\lambda}{2n}.$$

5. The system of claim 1, wherein n is the number of transmit antenna elements in the transmit array, and a steering matrix between transmit array and receive array is $$\Delta = \begin{bmatrix} 1 & \alpha & \cdots & \alpha^{n-1} \\ \alpha & 1 & \cdots & \alpha^{n-2} \\ \vdots & \vdots & \vdots & \vdots \\ \alpha^{n-1} & \alpha^{n-2} & \cdots & 1 \end{bmatrix}, \alpha = e^{\frac{i\pi}{n}},$$

an inverse steering matrix is $$Z = \Delta^{-1} = \begin{bmatrix} z_{11} & z_{12} & \cdots & z_{1n} \\ z_{21} & z_{22} & \cdots & z_{2n} \\ \vdots & \vdots & \vdots & \vdots \\ z_{n1} & z_{n2} & \cdots & z_{nn} \end{bmatrix},$$

and a formula for recovering an $i^{th}$ transmit signal, $X_i$, is $$X_i = \Sigma_{j=1}^{n} z_{ij} Y_j.$$

6. The system of claim 1, wherein an $i^{th}$ modulation symbol can be recovered from the $i^{th}$ recovered transmit signal $X_i$.

7. The system of claim 1, wherein the number and arrangement of transmit antenna elements and/or receive antenna elements may be adjusted to optimize one or both of the distance D and the distance R.

8. The system of claim 1, where the one or both of the transmit array and the receive array are uniform linear array.

9. The system of claim 1, where the one or both of the transmit array and the receive array are uniform planar array.

10. An analog, line of sight (LoS) spatial multiplexing system, comprising:
a transmit analog processor;
a transmit array configured with a first transmit element and a second transmit element spaced apart by no less than a distance D, the first transmit element in communication with the transmit analog processor for receiving a first modulation symbol for transmitting as a first transmit signal, the second transmit elements in communication with the transmit analog processor for receiving a second modulation symbol for transmitting as a second transmit signal;
a receive array configured with a first and a second receive element, the first receive element configured to receive a first receive signal comprising a combination of at least the first and the second transmit signals, the second receive element configured to receive a second receive signal comprising a different combination of at least the first and second transmit signals; and
a receive analog processor in communication with the receive array for processing the first and second receive signals in the analog domain to recover at least one of the first transmit signal and the second transmit signal, wherein an inverse steering matrix is utilized to recover the transmitted data.

11. The system of claim 10, wherein the inverse steering matrix is based at least in part on a fixed array-to-array distance.

12. The system of claim 10, wherein the inverse steering matrix is based at least in part on a known array-to-array distance.

13. The system of claim 12, wherein the known array-to-array distance is manipulated to compensate for non-ideal opposing orientations.

14. The system of claim 13, wherein manipulating the known array-to-array distance is accomplished by mechanically adjustments to the orientation of one or both of the arrays.

15. The system of claim 13, wherein manipulating the known array-to-array distance is accomplished on an element by element basis such as by adjusting one or more of R, λ, D, and n by adding or subtracting a constant.

16. The system of claim 13, wherein manipulating the known array-to-array distance is accomplished by applying a situation based function to one or more parameters R, λ, and D.

17. The system of claim 13, wherein orientation compensation is an arithmetic manipulation of one of the steering matrix and the inverse steering matrix.

18. The system of claim 13, wherein the arithmetic orientation compensation includes a static operation comprising applying a constant to one of the steering matrix and the inverse steering matrix.

19. The system of claim 13, wherein arithmetic orientation compensation includes a dynamic operation comprising the application of a dynamically adjusted variable to one of the steering matrix and the inverse steering matrix.

* * * * *